United States Patent
Jankowski et al.

[11] Patent Number: 6,129,627
[45] Date of Patent: Oct. 10, 2000

[54] AIR OUTLET ASSEMBLY HAVING OUTER AIR DIRECTING DOORS

[75] Inventors: Ireneusz Jankowski, Richmond Hill; Derrick Wayban Chow, Whitby; Robert Ronald Mitchell, King City, all of Canada

[73] Assignee: Collins & Aikman Plastics, Inc., Troy, Mich.

[21] Appl. No.: 09/176,176

[22] Filed: Oct. 21, 1998

[51] Int. Cl.[7] .................................................. B60H 1/34
[52] U.S. Cl. ........................ 454/155; 454/144; 454/318; 454/326
[58] Field of Search .................. 454/144, 155, 454/315, 318, 328, 326, 336

[56] References Cited

U.S. PATENT DOCUMENTS

| | | |
|---|---|---|
| 2,034,587 | 3/1936 | Maxwell . |
| 2,035,234 | 3/1936 | Hoper . |
| 2,135,810 | 11/1938 | Germonprez ............................ 454/318 |
| 2,223,940 | 12/1940 | Ragsdale et al. . |
| 2,388,419 | 11/1945 | Komenda . |
| 2,720,149 | 10/1955 | Groene . |
| 3,938,430 | 2/1976 | Koppang ............................. 454/318 X |
| 4,252,053 | 2/1981 | Muto et al. . |
| 4,432,213 | 2/1984 | Katahira et al. ........................... 62/239 |
| 4,541,611 | 9/1985 | Tannenläufer et al. ................. 251/228 |
| 4,610,196 | 9/1986 | Kern . |
| 4,711,159 | 12/1987 | Armbruster . |
| 5,120,271 | 6/1992 | Shtanko ................................. 454/137 |
| 5,234,373 | 8/1993 | Yamazaki et al. .................. 454/318 X |
| 5,383,815 | 1/1995 | Kiesel et al. ............................ 454/137 |
| 5,584,098 | 12/1996 | Koyama et al. ........................... 16/121 |
| 5,735,137 | 4/1998 | Kim ..................................... 454/351 X |
| 5,888,133 | 3/1999 | Mori et al. ............................... 454/318 |

FOREIGN PATENT DOCUMENTS 1-196447  8/1989  Japan ..................................... 454/318

*Primary Examiner*—Harold Joyce
*Attorney, Agent, or Firm*—Bliss McGlynn, P.C.

[57] ABSTRACT

An air outlet assembly is used to direct airflow of a climate control system of a motor vehicle. The air outlet assembly is used by the passengers sitting on a back seat in a passenger compartment. The air outlet assembly includes first and second doors which are used to open and close an outlet thereof. The doors also direct the air flowing therethrough. An actuator moves the doors between their respective open and closed positions. The actuator moves the second door from its open position, 90° with respect to the air outlet opening, toward its closed position as it moves the first door from an intermediate position, 90° with respect to the air outlet opening, toward its open position. This allows the doors to act in unison, after the first door passes the intermediate position, by moving in parallel form, to affect the direction of airflow. The actuator includes a single gear and rack for the first door and a pair of gears and a single rack for the second door. Each of the pair of gears moves the second rack in opposite directions. The second gear opens the second door and the third gear directs the airflow by moving the second door once it is opened. A recess pin associated with the second rack is engagable with the third gear to coordinate the transfer of the control of the second rack between the second and third gears. A set of horizontal louvers may also be adjusted to direct the airflow in vertical directions.

17 Claims, 4 Drawing Sheets

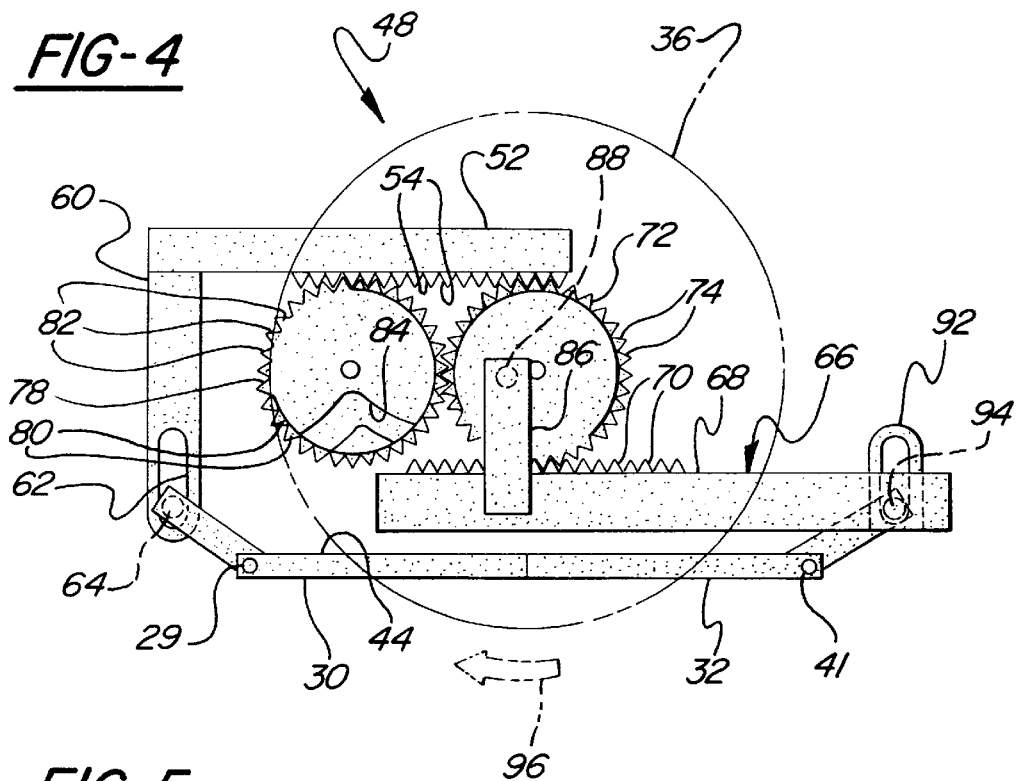
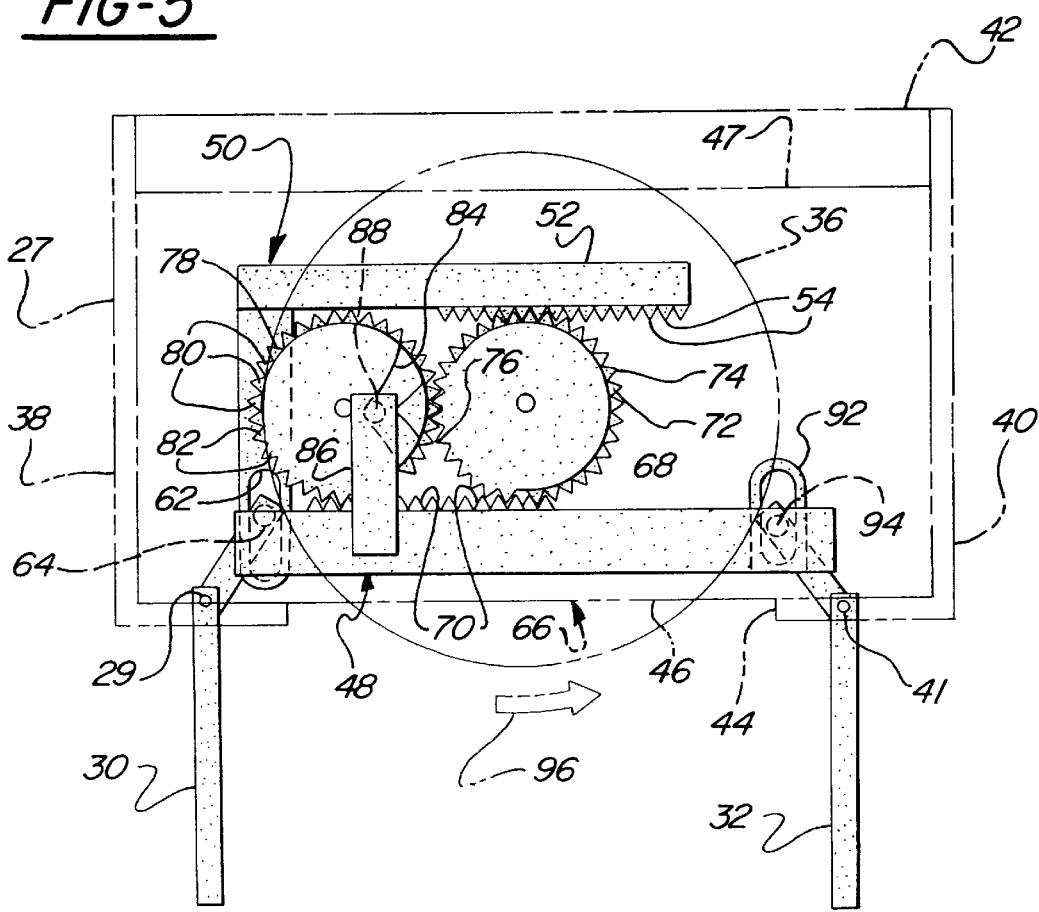

AIR OUTLET ASSEMBLY HAVING OUTER AIR DIRECTING DOORS

BACKGROUND OF THE INVENTION

1. Field of the Invention

The invention relates to an air outlet assembly generally used in motor vehicles. More specifically, the invention relates to an air outlet assembly having doors capable of directing the air as it flows therethrough.

2. Description of the Related Art

Air outlets are commonly utilized in heating, ventilation and air conditioning systems of motor vehicles. Various types of air outlets are provided depending upon special functions, air directability and design constraints within the motor vehicle. Typically, air outlets are opened and closed using a plurality of louvers which do not extend beyond the outermost portion of the air outlet housing. An example of such an air outlet is shown in U.S. Pat. No. 4,252,053, issued to Muto, et al. on Feb. 24, 1981.

U.S. Pat. No. 2,034,587, issued to Maxwell on Mar. 17, 1936, discloses an air outlet including a deflector which extends out past the housing of the air outlet. In the embodiment shown, the deflector is a two-piece cover which pivots an axis which extends across the middle of the air outlet. Although simple in design, the operator of the air outlet must operate each of the deflecting doors independently of each other. Further, because the axis of pivoting is through the center of the air outlet, the deflectors will never be able to cooperate with each other to maximize the air flow being directed in a particular direction. Although the air flow may be directed in one direction by keeping one of the deflectors closed, this is not an optimal use of the air outlet because half of the air outlet is closed. A similar design is disclosed in U.S. Pat. No. 2,035,234, issued to Hoper on Mar. 24, 1936.

U.S. Pat. No. 4,541,611, issued to Tannenläufer, et al. on Sep. 17, 1985, discloses an actuating element which controls the flow of air through an air duct. The actuating element is controlled by a Bowden cable to rotate the actuating element about its hinge. The actuator requires the use of the Bowden cable and its housing to properly open and close the flap with respect to the air duct.

U.S. Pat. No. 5,383,815, issued to Kiesel, et al. on Jan. 24, 1995, discloses an air conduit used to ventilate the interior of a motor vehicle. An air outlet includes a closable outlet nozzle. The outlet nozzle is depicted as having a plurality of louvers extending out past the housing of the outlet. This disclosure is silent as to the use of these louvers and their capability of closing the nozzle and/or directing the air that is passed therethrough.

Therefore, there is a need in the art to simply and effectively open and close an air outlet of a motor vehicle and, at the same time, direct the air that is passing through the open air outlet.

SUMMARY OF THE INVENTION

The invention is an air outlet assembly which is securable to a structure.

The air outlet assembly includes a housing which is fixedly secured to the structure. The housing defines a first and second side, an inlet and an outlet. The air outlet assembly includes a plurality of louvers extending between the first and second sides. The air outlet assembly further includes a door which is pivotally secured to the housing adjacent to and outside of the outlet such that the door pivots between an open position allowing air to flow through the outlet and a closed position wherein the door covers the outlet, the plurality of louvers and a portion of the housing.

One advantage associated with the invention is the ability to open and close an air outlet. Another advantage associated with the invention is the ability to open and close an air outlet using a door. Yet another advantage associated with the invention is the ability to direct the air passing through an open air outlet using the same structure which opens and closes the air outlet. Still another advantage associated with the invention is the ability to direct air passing through an open air outlet using an actuator to direct the air flow which is simple to operate. Yet another advantage associated with the invention is the ability to provide a directable and closable mechanism for an air outlet which is easy to manufacture.

BRIEF DESCRIPTION OF THE DRAWINGS

Other advantages of the invention will be readily appreciated as the same becomes better understood by reference to the following detailed description when considered in connection with the accompanying drawings, wherein:

FIG. 4 is a top view of one embodiment of an actuator for the invention with the doors in the closed position;

FIG. 5 is a top view of one embodiment of the actuator of the invention with the doors in an intermediate position.

DETAILED DESCRIPTION OF THE PREFERRED EMBODIMENT(S)

Figure 1:
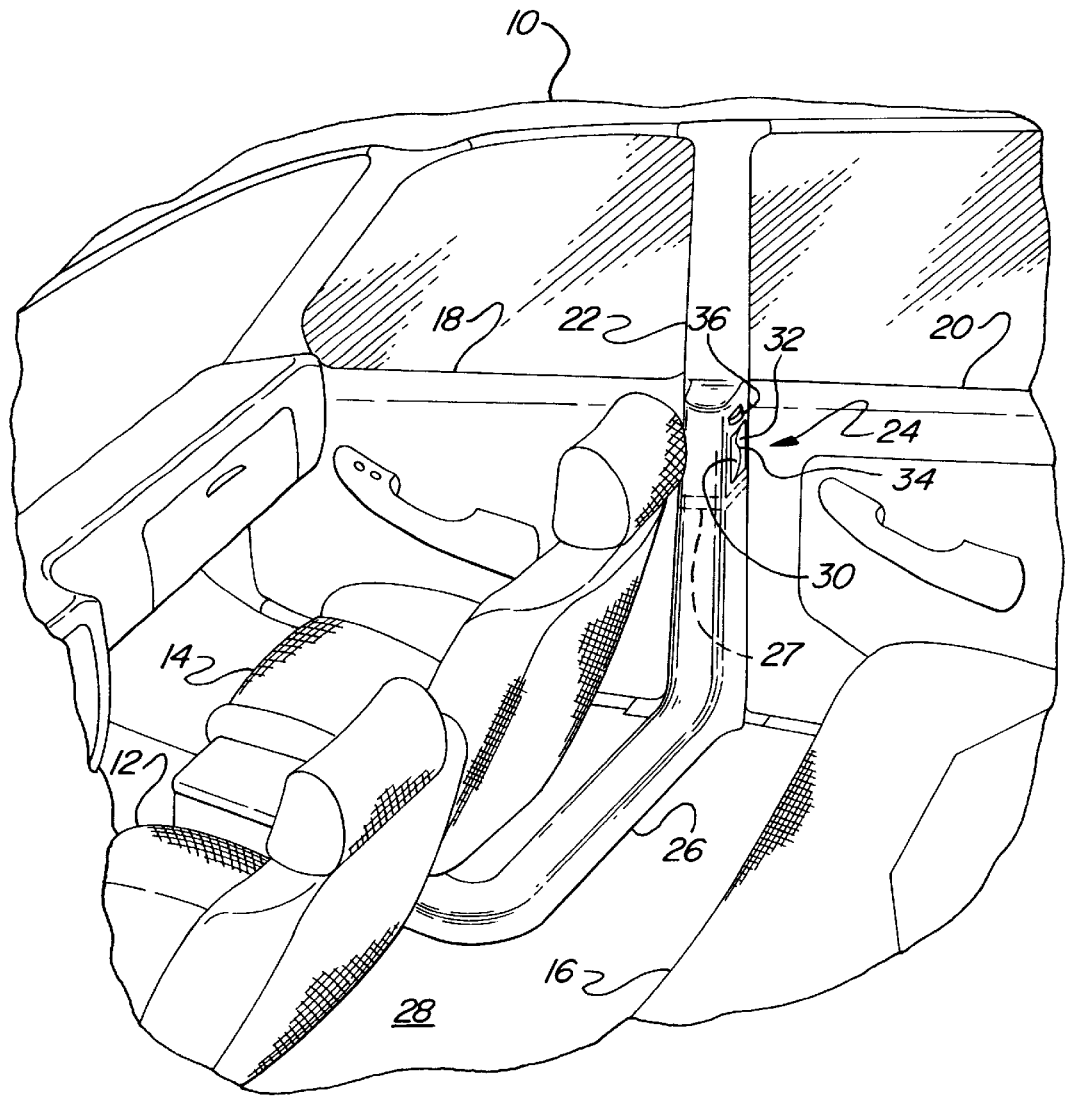
FIG. 1 is a perspective view of a passenger compartment, partially cut away, of a motor vehicle incorporating one embodiment of the invention.
Figure 2:
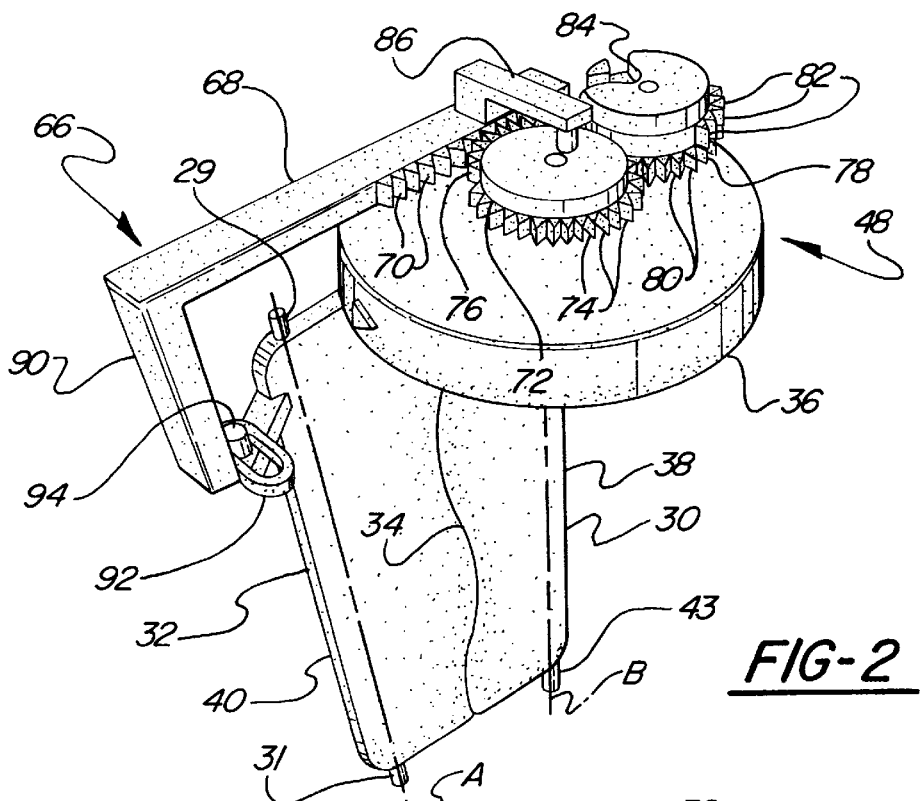
FIG. 2 is a perspective view of an embodiment of an actuator for the invention.
Figure 3:
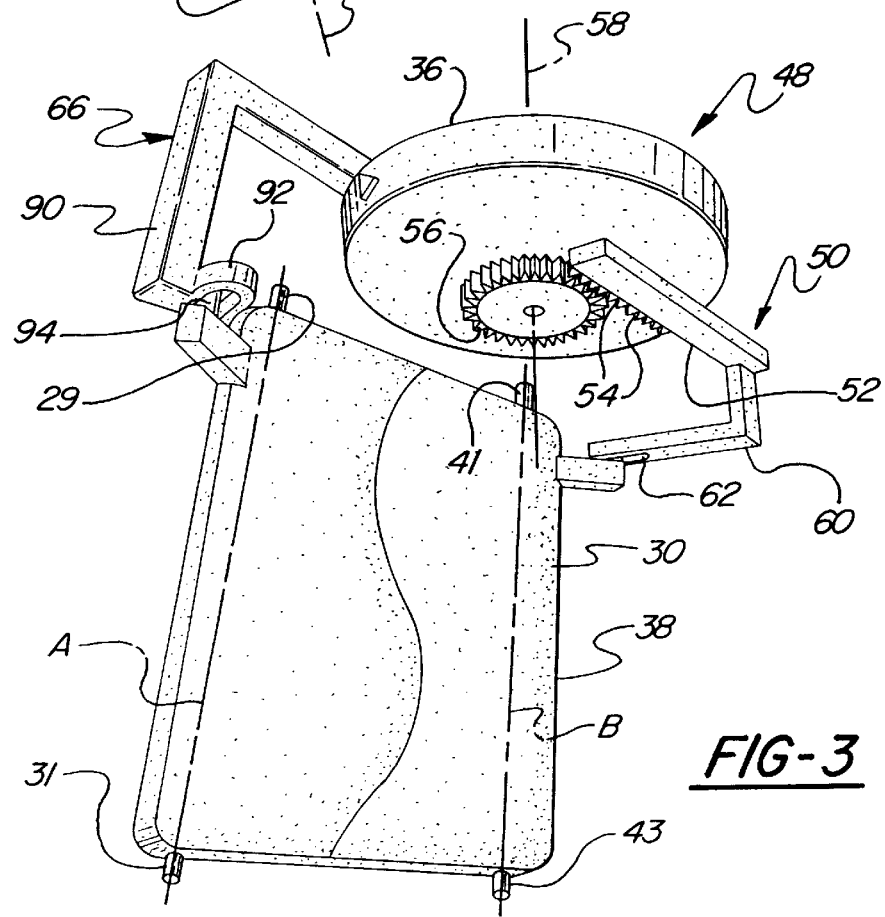
FIG. 3 is another perspective view of the embodiment of the actuator for the invention.

Referring to FIG. 1, a portion of a passenger compartment 10 is shown having a driver seat 12, a passenger seat 14 and a rear bench seat 16. A front passenger door 18 and a rear passenger door 20 are separated by a B-pillar 22. Typically, a front passenger restraint system (not shown), i.e., a seat belt harness, is secured to the B-pillar 22. It may be appreciated by those skilled in the art that a similar B-pillar, front driver door and rear driver door are located on the opposite side of the passenger compartment 10. For reasons of simplicity, however, the description of the invention will be limited to the structure found on the passenger side of the passenger compartment 10 as is shown in the Figures.

The invention, an air outlet assembly, is generally indicated at 24. The air outlet assembly 24 is an outlet for an air passage 26 which extends along a floor 28 of the passenger compartment 10 and extends up along a portion of the B-pillar 22. It may be appreciated by those skilled in the art that the air passage 26 may extend along a number of paths including, but not limited to, extending underneath the floor 28 of the passenger compartment 10 or along the floor 28 directly between the passenger seat 14 and the front passenger door 18. Further, the air passage 26 may be incorporated into the structure of the B-pillar 22 or, in the alternative, it may be fabricated separately from the B-pillar 22 such that the air passage 26 is attached to the B-pillar 22 after the construction of the B-pillar 22.

The air passage 26 defines a housing 27, discussed subsequently. The air outlet assembly 24 includes at least one door 30. As is shown in the Figures, the preferred embodiment of the invention includes a second door 32 wherein the first 30 and the second 32 doors meet along a curved path 34. The air outlet assembly 24 further includes a thumb wheel 36, discussed subsequently. The doors 30, 32 and the thumb wheel 36 extend out from the housing 27.

Referring to FIG. 5, the housing 27 defines a first side 38 and a second side 40. The housing 27 further defines an inlet 42 and an outlet 44. The outlet 44 defines a plane 46. It may be appreciated by those skilled in the art that the plane 46 may be defined by a curvature other than zero as may be desired for aesthetic purposes. A plurality of louvers 47 extend from the first side 38 to the second side 40 inside the housing 27. Each of the louvers 47 are generally flat and are parallel to each other.

Figure 6:
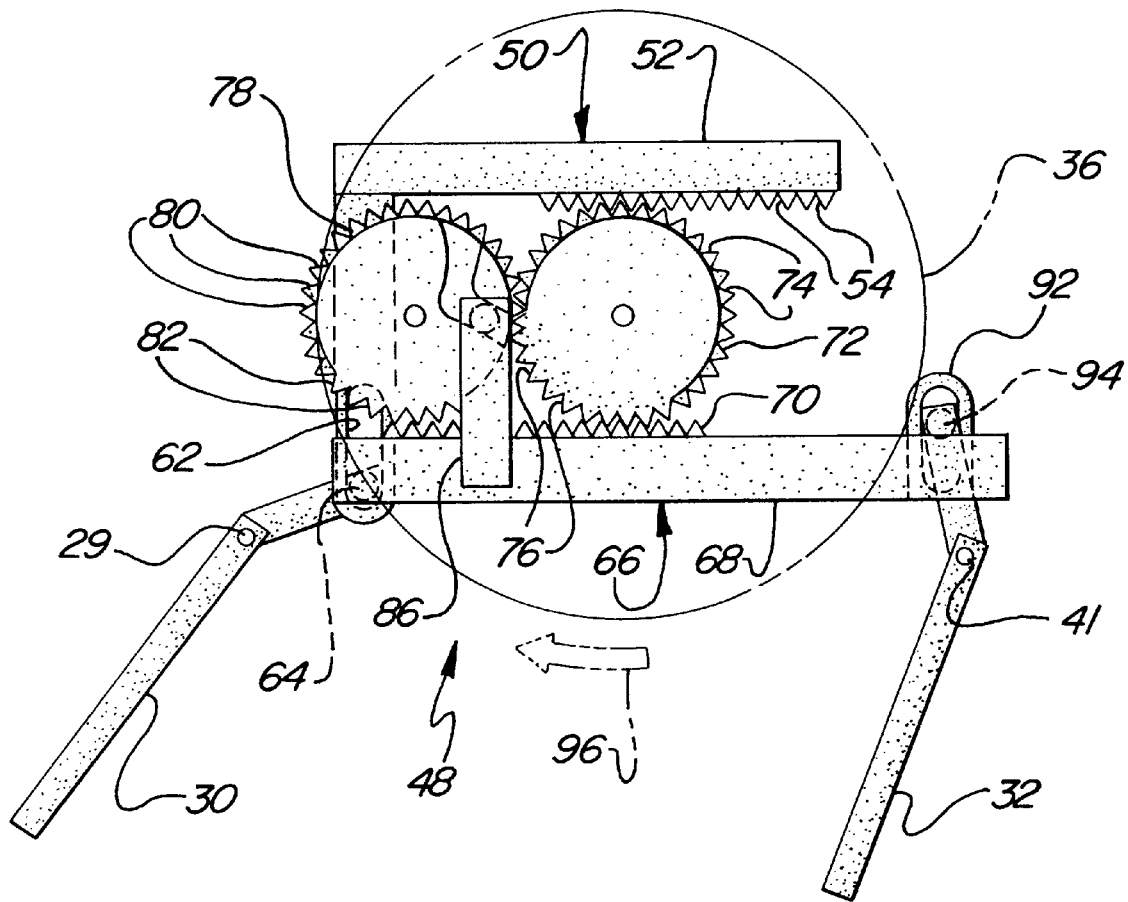
FIG. 6 is a top view of one embodiment of the actuator for the invention with the doors moved to an open position.

Referring to FIGS. 2 through 6, the first door 30 is pivotally secured to the housing 27 adjacent the first side 38 thereof. Pins 29, 31 define an axis of rotation A about which the first door 30 pivots. The first door 30 is pivotal between a first closed position (FIGS. 2, 3 and 4) and a first open position (FIG. 6). The first open position for the first door 30 defines an obtuse angle between the first door 30 and the plane 46 of the outlet 44. The first door 30 pivots through an intermediate position (FIG. 5) between the first closed position and the first open position. In the preferred embodiment, the intermediate position is a position 90° from the plane 46.

The second door 32 is pivotally secured to the housing 27 adjacent the second side 40 thereof. Pins 41, 43 define an axis of rotation B about which the second door 32 pivots. The second door 32 pivots between a second closed position (FIGS. 2, 3 and 4) substantially covering the remaining portion of the outlet 44 and a second open position defining a generally perpendicular angle between the second door 32 and the plane 46 of the outlet 44 (FIG. 5). Therefore, the second door 32 never extends to an angle with respect to the plane 46 which is as large as the obtuse angle created by the first door 30 with respect to the plane 46. In the preferred embodiment, the second door 32 never extends to an angle that is obtuse with respect to the plane 46 of the outlet 44.

An actuator, generally indicated at 48, engages the first 30 and second 32 doors. The actuator 48 pivots the first door 30 between the first closed position and the first open position. The actuator 48 also pivots the second door 32 between the second closed position and the second open position. In addition, the actuator pivots the second door 32 from the second open position toward the second closed position while it pivots the first door 30 from the intermediate position toward the first open position. The actuator 48 moves the first 30 and second 32 doors until they become generally parallel to each other and perpendicular to the plane 46 of the outlet 44, i.e., the intermediate position of the first door 30 and the open position of the second door 32. Once the first door 30 moves past the intermediate position, the second door 32 moves from its second open position towards the second closed position. This movement results in the first 30 and second 32 doors defining supplementary angles with respect to the plane 46 defined by the outlet 44 when the first door 30 is moving between the intermediate position and the first closed position. Further, the first 30 and second 32 doors define angles with respect to the plane 46 defined by the outlet 44 which are equal to each other when the first door 30 is between the closed position and the intermediate position.

The actuator 48 includes a first linkage 50. The first linkage 50 links the first door 30 to the actuator 48. The first linkage 50 includes a first rack 52 having a plurality of teeth 54. The first linkage 50 further includes a first gear 56 (best seen in FIG. 3) which is engagable with the first rack 52. In the preferred embodiment, the first gear 56 is engaged with the first rack 52 at all times. The first gear 56 is fixedly secured to the thumb wheel 36. The first gear 56 and the thumb wheel 36 rotate about the same axis 58. There is no lost motion between the thumb wheel 36 and the first gear 56. An L-shaped link 60 connects the first rack 52 to the first door 30. A slotted opening 62 receives a hinge pin 64 therein.

The actuator 48 of the air outlet assembly 24 further includes a second linkage 66 which links the second door 32 to the actuator 48. The second linkage 66 includes a second rack 68 having a plurality of teeth 70. The second linkage 66 also includes a second gear 72 which is engagable with the plurality of teeth 70 of the second rack 68. The second gear 72 includes second gear timing teeth 74 which surround the entire second gear 72. More specifically, the total periphery of the second gear 72 is covered with second gear timing teeth 74.

The second gear 72 further includes second gear engaging teeth 76 which surround a portion of the second gear 72. In the embodiment shown in the Figures, the second gear engaging teeth 76, engagable with the plurality of teeth 70 on the second rack 68, surround the portion of the second gear 72 directly above the second gear timing teeth 74. It may be appreciated by those skilled in the art that the second gear timing teeth 74 may also be located above the second gear engaging teeth 76. Although a unitary structure, the second gear 72 may be said to have a two-level or tier structure with the first level for the second gear timing teeth 74 and the second level for the second gear engaging teeth 76.

The second linkage 66 includes a third gear 78 which is engagable with the second gear 72 and the second rack 68. More specifically, the third gear 78 includes third gear timing teeth 80 which surround the third gear 78 and are engagable with the second gear timing teeth 74. Therefore, the third gear 78 rotates when the second gear 72 rotates. Further, because the second 74 and third 80 gear timing teeth are identical in form, size, and spacing, the third gear 78 meshes with the second gear 72 and rotates at the same speed as the second gear 72 in the opposite direction thereof.

The third gear 78 also includes third gear engaging teeth 82 which extend around a portion of the third gear 78. The third gear engaging teeth 82 are engagable with the second rack 68 independently of when the second gear engaging teeth 76 engage the second rack 68. In both the second 72 and third 78 gears, the second gear engaging teeth 76 and the third gear engaging teeth 82 extend around a portion of the circumference of their respective gears 72, 78 above the second 74 and third 80 gear timing teeth. Further, at no time is the plurality of teeth 70 engaging the second gear engaging teeth 76 at the same time as when the plurality of teeth 70 engages the third gear engaging teeth 82.

Although a unitary structure, the third gear 78 may be said to have a three-level or tier structure with the first level for the third gear timing teeth 80 and the second level for the third gear engaging teeth 82.

The third gear 78 also includes a third level or tier for a recess 84. In the preferred embodiment, the recess is a channel 84 extending through a curved path. The second rack 68 includes an extension 86 which is movable into and out of the recess 84 to limit the movement of the second rack 68 between engagement of the second gearing engaging teeth 76 of the second gear 72 and the engagement of the third gear engaging teeth 82 of the third gear 78 by the plurality of teeth 70 of the second rack 68. The extension includes a recess pin 88 which extends down into the recess 84. As may be appreciated when viewing FIG. 2, the recess 84 extends through a portion of the third gear 78 above the third gear 78 at a point higher than the height of the second gear 72. This allows the recess pin 88 to traverse across the second gear 72 unencumbered before it engages the third gear 78 and its recess 84.

The thumb wheel 36 is fixedly secured to the first 56 and second 72 gears. The thumb wheel 36 is between the first 56 and second 72 gears. The second gear 72 also rotates about the axis 58 shared by the thumb wheel 36 and the first gear 56. A portion of the thumb wheel 36 extends out beyond the housing 27.

The second linkage 66 includes a downward link 90 which extends between the second rack 68 and a slot clasp 92. The slot clasp 92 receives a second hinge pin 94 which is secured to a second door 32.

In operation, the doors 30, 32 are in a closed position, as shown in FIGS. 1 through 4, to prevent air from passing through the air passage 26 and out the outlet 44. As the thumb wheel 36 is rotated in the direction of arrow 96, the first gear 56 moves the first rack 52 from left to right, as shown in FIGS. 4 through 6. This opens the first door 30 from the closed position toward the open position. As the thumb wheel 36 is rotated in the direction of arrow 96, the second gear 72 moves the second rack 68 from right to left as represented by FIGS. 4 through 6. This pivots the second door 32 from the closed position (FIG. 4) toward the open position. As the first door 30 moves from its closed position toward its intermediate position (FIG. 5), the angle defined by the plane 46 and the first door 30 is equal to the angle defined by the plane 46 and the second door 32 as it moves between its second closed position and its second open position. Once the second door 32 is perpendicular to the plane 46 of the outlet 44, i.e., its open position, the second gear engaging teeth 76 disengage the second rack 68. The second gear 72 continues to rotate in the same direction as the thumb wheel 36 is rotated which rotates the third gear 78 such that the recess 84 receives the recess pin 88 preventing the second linkage 66 from moving until the third gear engaging teeth 82 engage the second rack 68. As the third gear engaging teeth 82 engage the second rack 68, the recess pin 88 is released from the recess 84 and the second door 32 is moved from the second open position toward the second closed position in a manner which is generally parallel to the movement of the first door 30 past the intermediate position (FIG. 5) toward its first open position (FIG. 6). Because the doors 30, 32 are moving in parallel fashion, they create supplemental angles with respect to the plane 46.

When it is desired to close the doors 30, 32, the thumb wheel 36 is rotated in a counterclockwise direction. The doors 30, 32 rotate back to their respective closed positions in a manner similar to the manner in which they were opened. Therefore, the doors 30, 32 pivot back toward the intermediate position (FIG. 5). It is at this position, 90°, that the doors 30, 32 cease moving in positions which are supplementary to each other with respect to the plane 46, and move at angles which are equal to each other until they reach the closed position (FIG. 4) at 0°.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. An air outlet assembly securable to a structure, said air outlet assembly comprising:

a housing fixedly secured to the structure, said housing defining first and second sides, an inlet and an outlet defining a plane;

a first door pivotally secured to said housing adjacent said first side and pivotal between a first closed position substantially covering a portion of said outlet and a first open position defining an obtuse angle between said first door and said plane of said outlet, said first door passing through an intermediate position between said first closed and first open positions;

a second door pivotally secured to said housing adjacent said second side and pivotal between a second closed position substantially covering a remaining portion of said outlet and a second open position defining a generally perpendicular angle between said second door and said plane; and an actuator engaging said first and second doors to pivot said first door between said first closed position and said first open position and to pivot said second door between said second closed position and said second open position and back from said second open position toward said second closed position while said actuator pivots said first door between said intermediate position and said first open position such that angles defined by said first and second doors with respect to said plane are supplementary when said first door is between said intermediate position and said first closed position and the angles defined by said first and second doors with respect to said plane are equal when said first door is between said first open position and said intermediate position.

2. An air outlet assembly as set forth in claim 1 wherein said intermediate position is defined as said first door being generally perpendicular to said plane.

3. An air outlet assembly as set forth in claim 1 wherein said actuator includes a first linkage linking said first door to said actuator.

4. An air outlet assembly as set forth in claim 3 wherein said first linkage includes a first rack.

5. An air outlet assembly as set forth in claim 4 wherein said first linkage includes a first gear engagable with said first rack.

6. An air outlet assembly as set forth in claim 5 wherein said actuator includes a second linkage linking said second door to said actuator.

7. An air outlet assembly as set forth in claim 6 wherein said second linkage includes a second rack.

8. An air outlet assembly as set forth in claim 7 wherein said second linkage includes a second gear engagable with said second rack.

9. An air outlet assembly as set forth in claim 8 wherein said second linkage includes a third gear engagable with said second gear and said second rack.

10. An air outlet assembly as set forth in claim 9 wherein said second gear includes second gear timing teeth surrounding said second gear.

11. An air outlet assembly as set forth in claim 10 wherein said second gear includes second gear engaging teeth surrounding a portion of said second gear, said second gear engaging teeth engagable with said second rack.

12. An air outlet assembly as set forth in claim 11 wherein said third gear includes third gear timing teeth surrounding said third gear and engaging said second gear timing teeth such that said third gear rotates when said second gear rotates.

13. An air outlet assembly as set forth in claim 12 wherein said third gear includes third gear engaging teeth surrounding a portion of said third gear, said third gear engaging teeth engagable with said second rack independently of said second gear.

14. An air outlet assembly as set forth in claim 13 wherein said third gear includes a recess.

15. An air outlet assembly as set forth in claim 14 wherein said second rack includes an extension movable into and out of said recess to limit movement of said second rack between engagement of said second gear engaging teeth and engagement of said third gear engaging teeth.

16. An air outlet assembly as set forth in claim 15 wherein said actuator includes a wheel fixedly secured to said first and second gears, a portion of said wheel extending out beyond said housing.

17. An air outlet assembly securable to a structural component of a passenger compartment of a motor vehicle, said air outlet assembly comprising:

a housing fixedly secured to the structural component, said housing defining first and second sides, an inlet and an outlet defining a plane;

a first door pivotally secured to said housing adjacent said first side and pivotal between a first closed position substantially covering a portion of said outlet and a first open position defining an obtuse angle between said first door and said plane of said outlet, said first door passing through an intermediate position between said first closed and first open positions;

a second door pivotally secured to said housing adjacent said second side and pivotal between a second closed position substantially covering a remaining portion of said outlet and a second open position defining a generally perpendicular angle between said second door and said plane; and an actuator engaging said first and second doors to pivot said first door between said first closed position and said first open position and to pivot said second door between said second closed position and said second open position and back from said second open position toward said second closed position while said actuator pivots said first door from said intermediate position toward said first open position, said actuator including a wheel rotatable through a single direction to pivot said second door from said second closed position toward said second open position, and back toward said closed position after said first door moves from said intermediate position toward said first open position.

* * * * *